Figure 6:
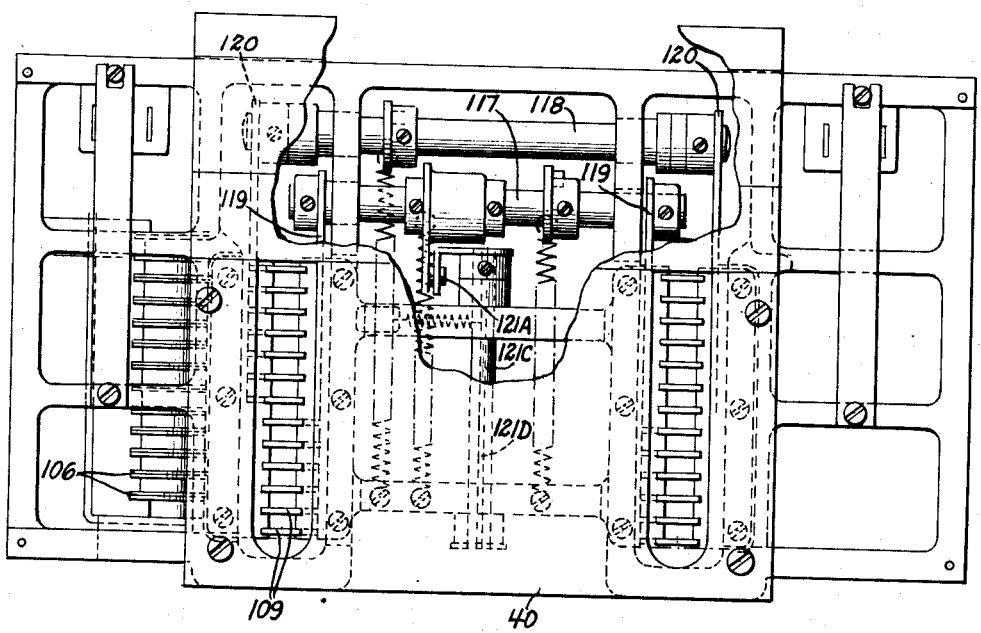

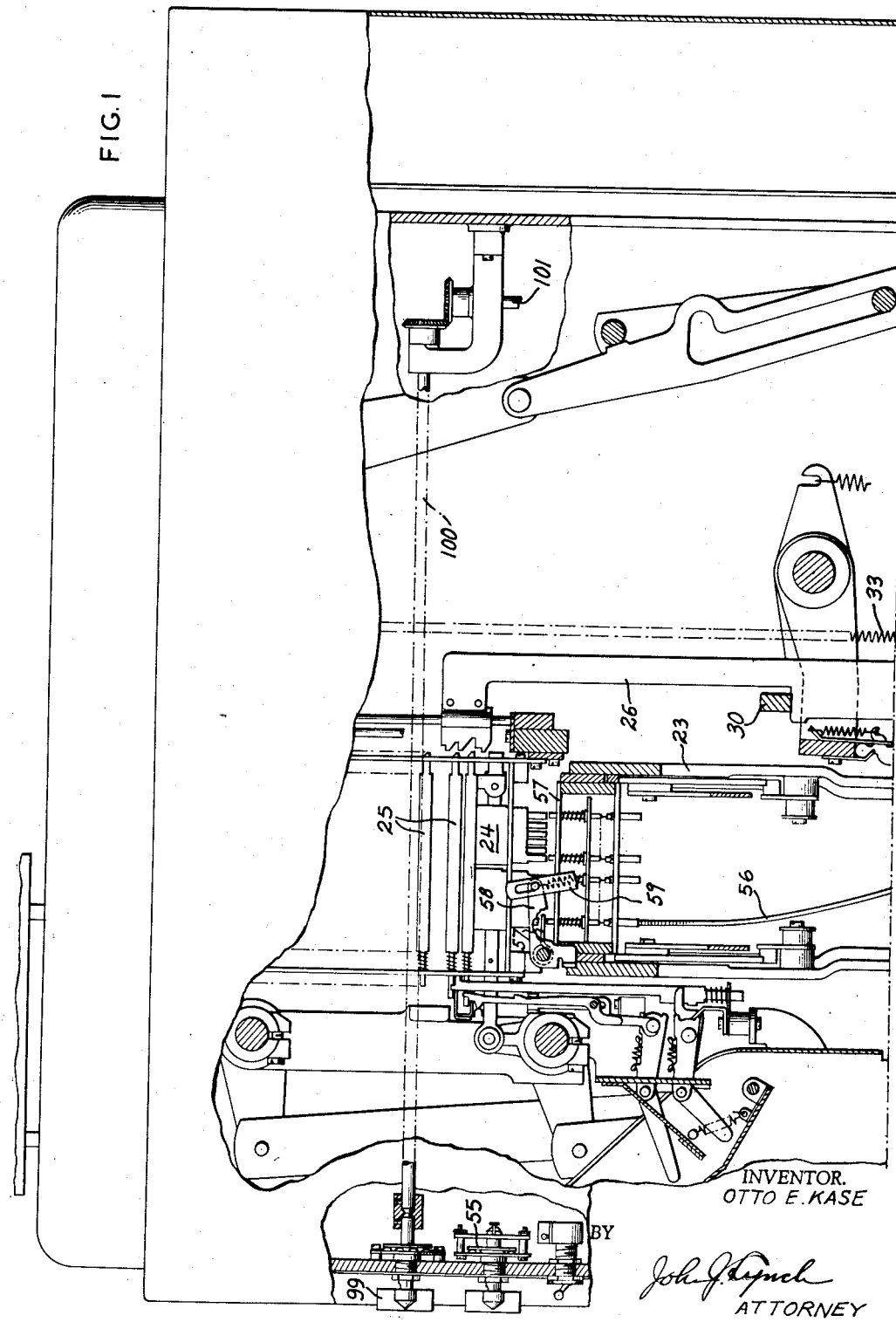
March 8, 1960 — O. E. KASE — 2,927,529
SELECTIVE POSTING INTERPRETER
Filed Oct. 27, 1958 — 10 Sheets-Sheet 1
INVENTOR.
OTTO E. KASE
ATTORNEY

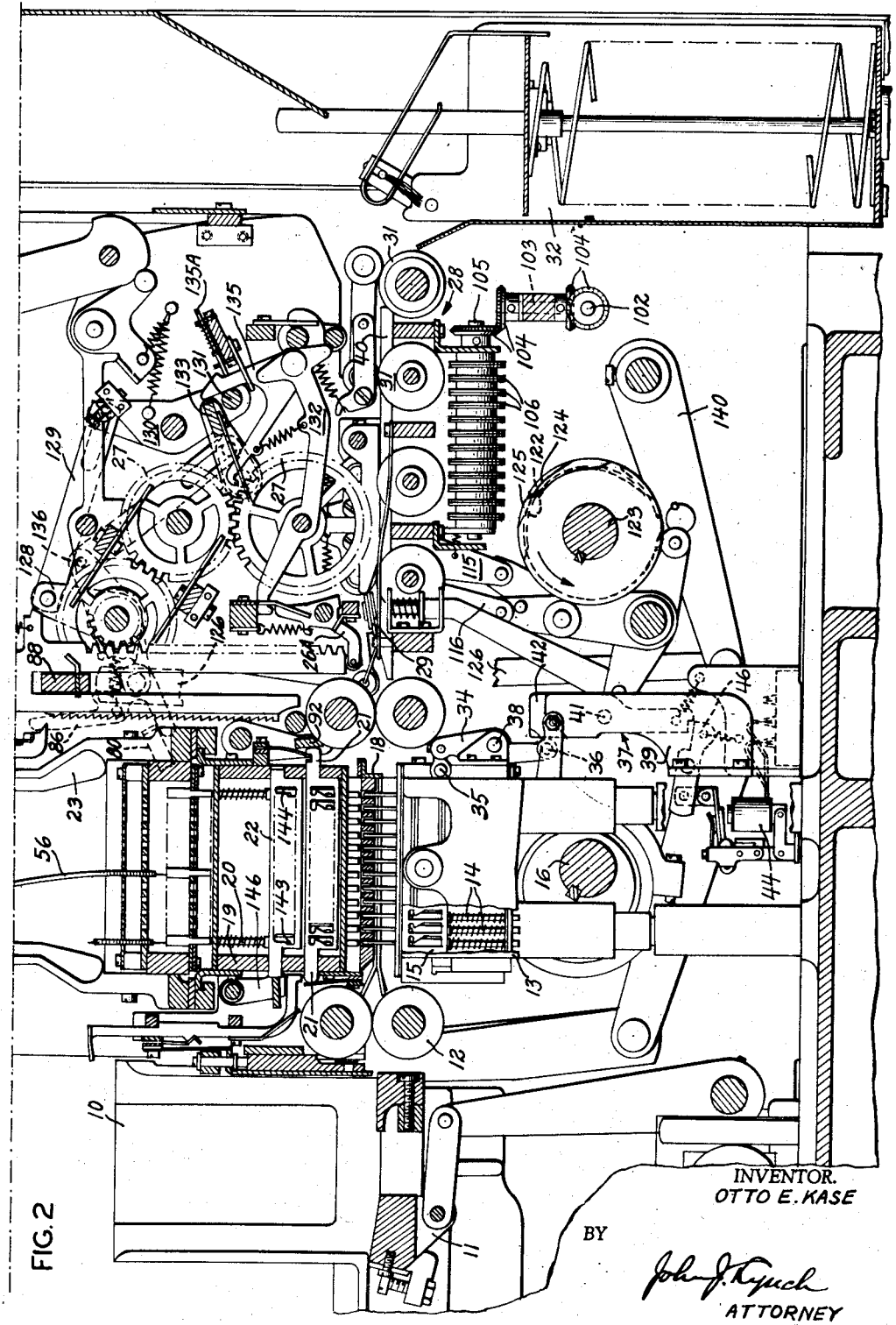

March 8, 1960
O. E. KASE
2,927,529
SELECTIVE POSTING INTERPRETER
Filed Oct. 27, 1958
10 Sheets-Sheet 3
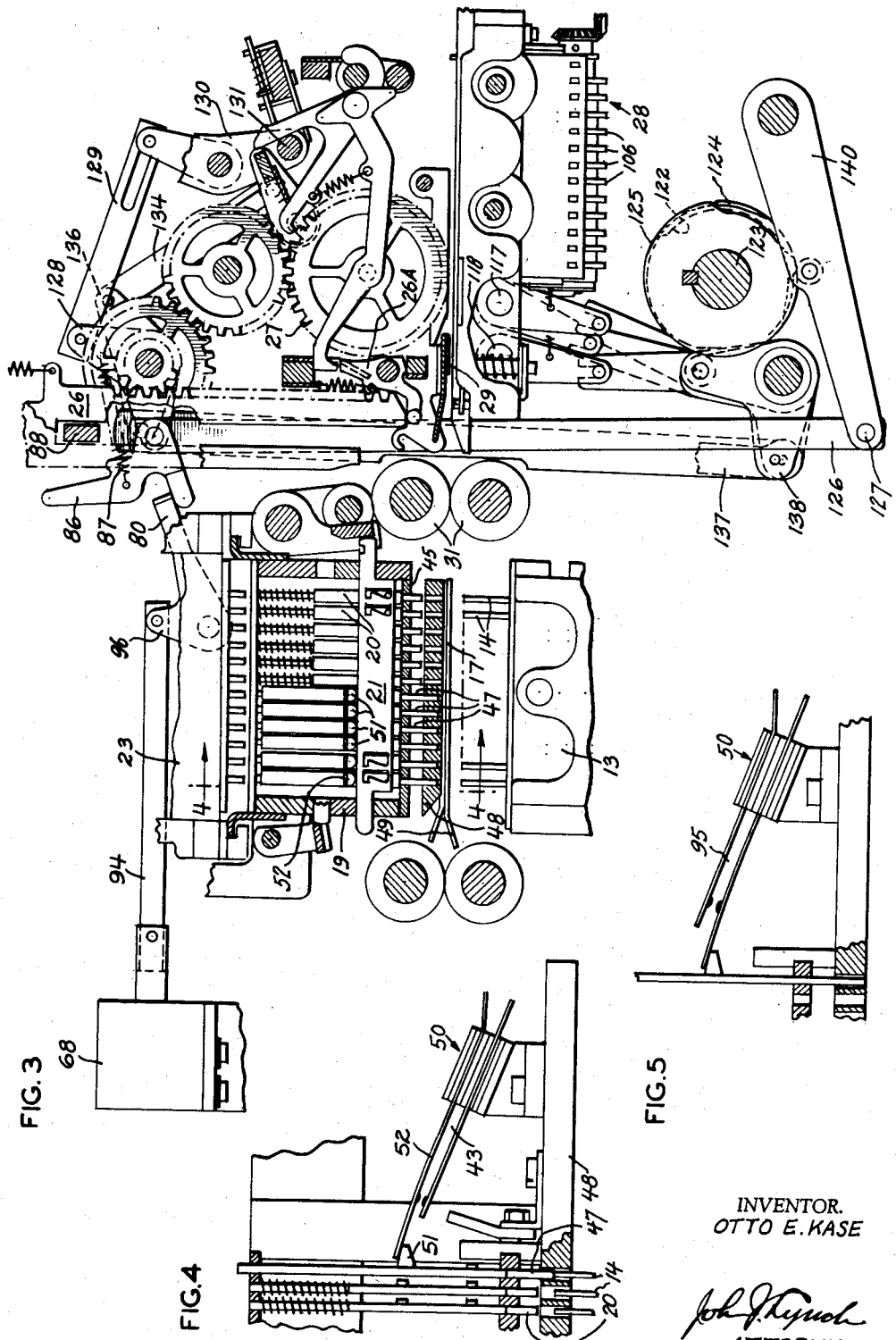
INVENTOR.
OTTO E. KASE
ATTORNEY March 8, 1960  O. E. KASE  2,927,529
SELECTIVE POSTING INTERPRETER
Filed Oct. 27, 1958  10 Sheets-Sheet 4

INVENTOR.
OTTO E. KASE
BY
ATTORNEY

March 8, 1960  O. E. KASE  2,927,529
SELECTIVE POSTING INTERPRETER
Filed Oct. 27, 1958  10 Sheets-Sheet 5

INVENTOR.
OTTO E. KASE
BY
John J. Lynch
ATTORNEY

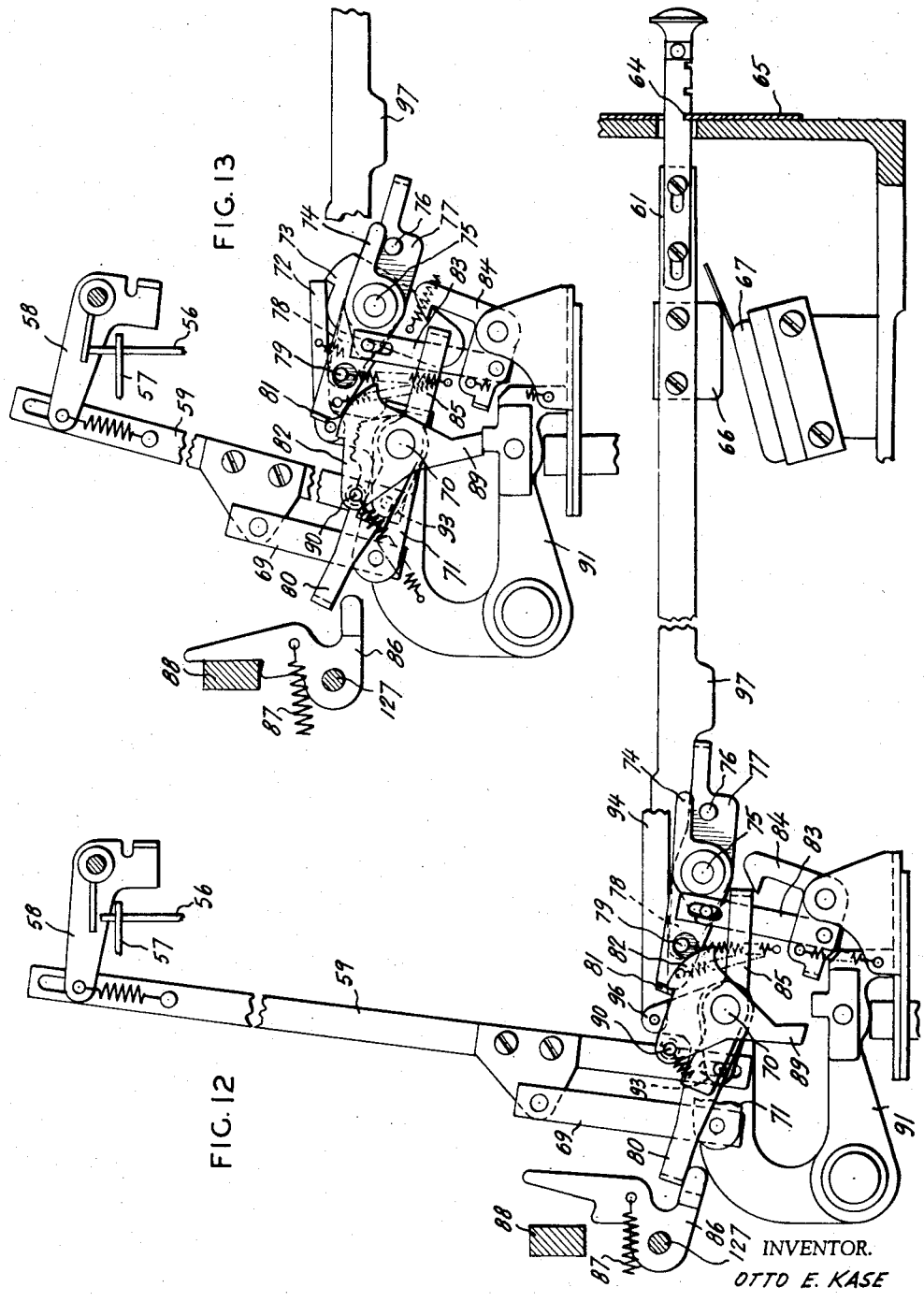

March 8, 1960  O. E. KASE  2,927,529
SELECTIVE POSTING INTERPRETER
Filed Oct. 27, 1958  10 Sheets-Sheet 7
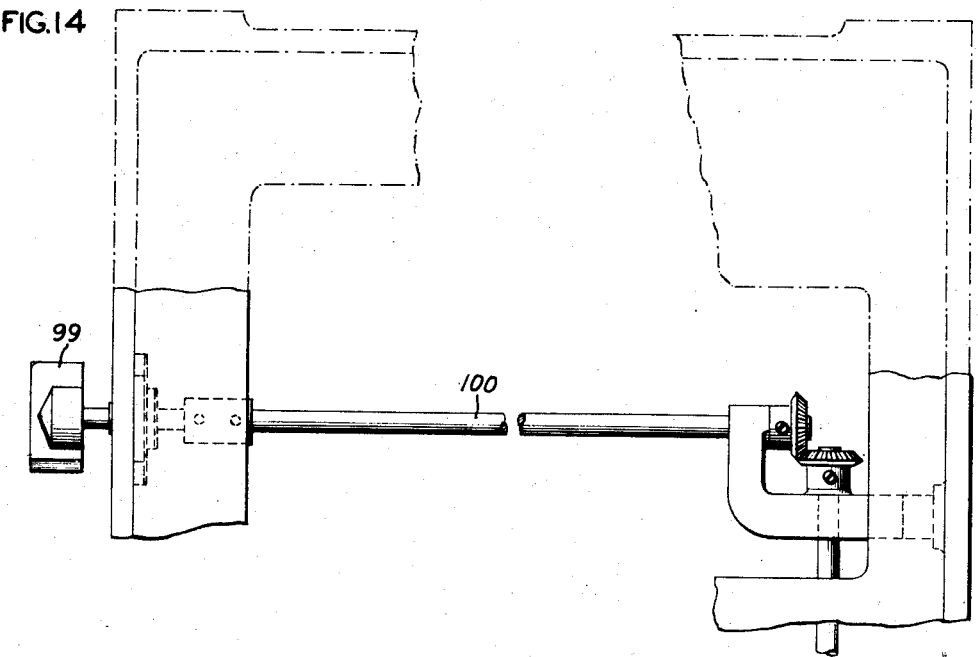
FIG.14
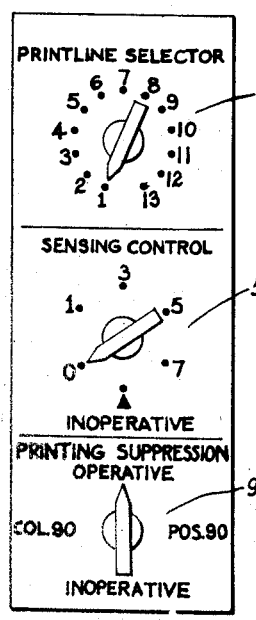
FIG.17
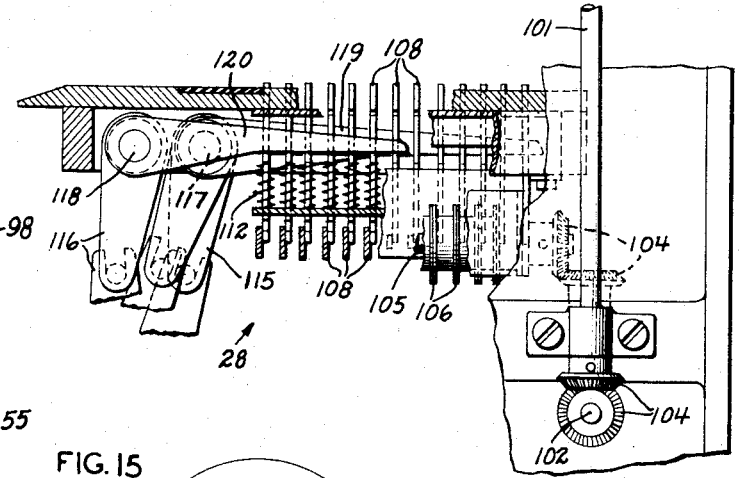
FIG.15
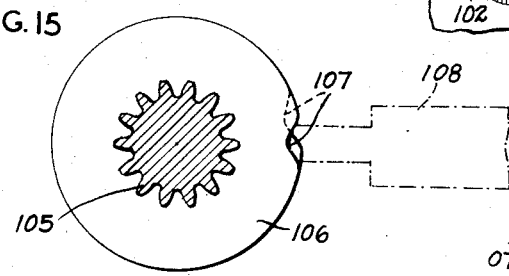
INVENTOR.
OTTO E. KASE
BY
ATTORNEY

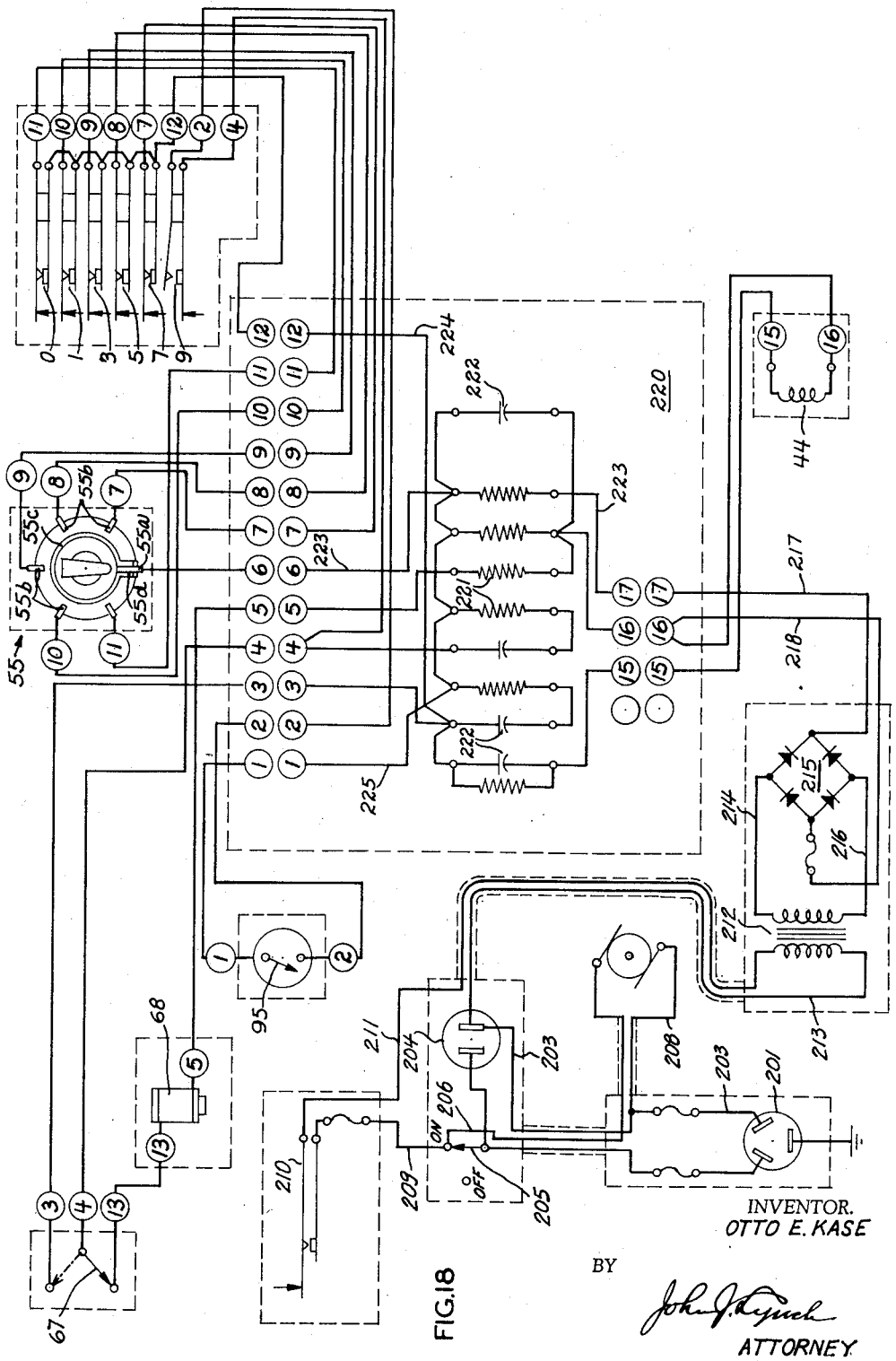

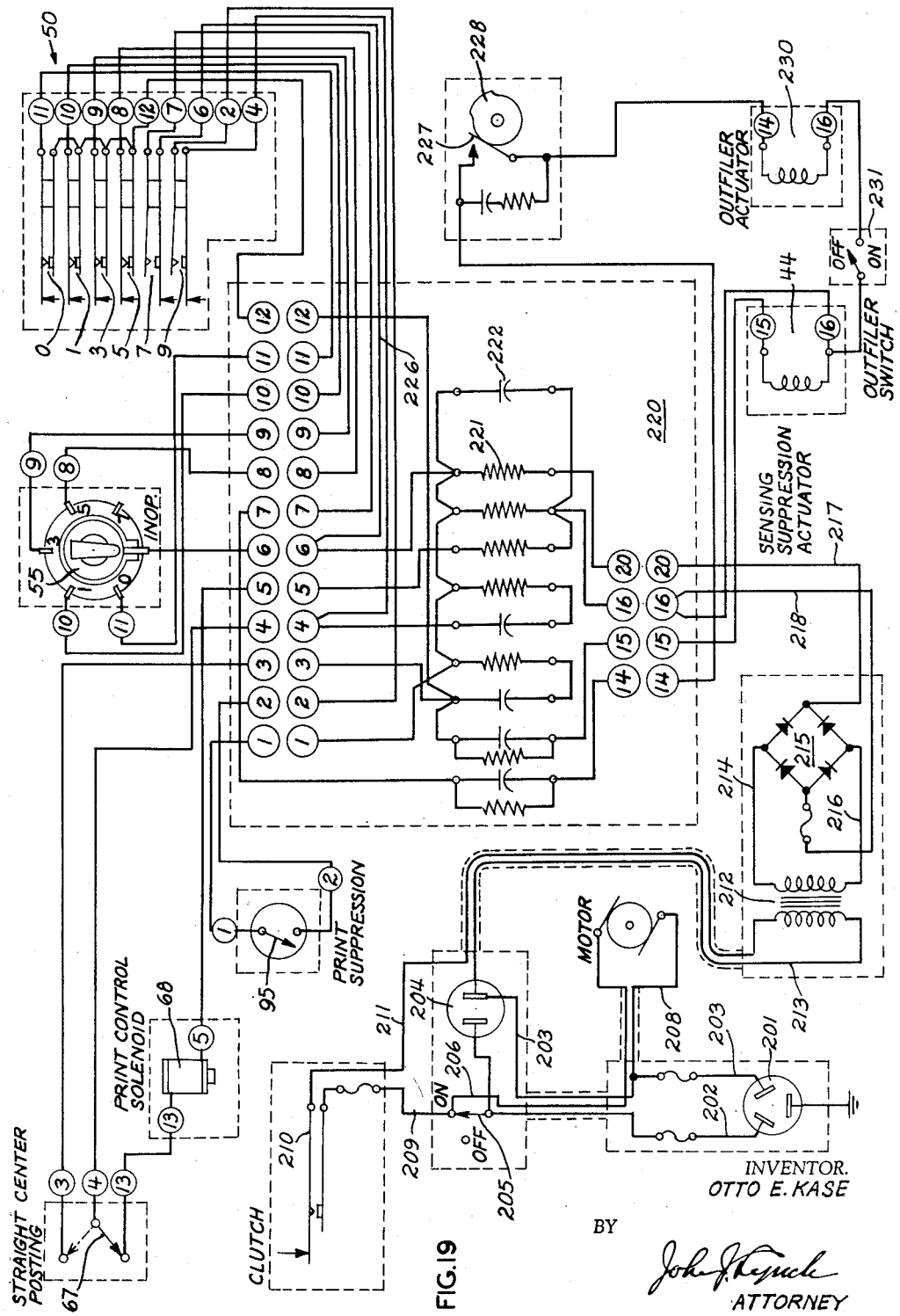

United States Patent Office 2,927,529
Patented Mar. 8, 1960

2,927,529

SELECTIVE POSTING INTERPRETER

Otto E. Kase, Stamford, Conn., assignor to Sperry Rand Corporation, New York, N.Y., a corporation of Delaware Application October 27, 1958, Serial No. 769,619

19 Claims. (Cl. 101—93)

This invention relates to data card handling equipment and in particular to a machine for sensing data punched in cards of one group and for printing the sensed data on other cards of a different group.

One of the objects of the invention is to provide control means for operation of a machine of the character referred to, whereby a group of master or lead cards can be so punched that the data therein can be retained during the passage of following lead cards without sensing or printing, the latter operation taking place on all except certain selected trailer cards. As one example, intended to bring out the objects of the invention, a deck of cards is arranged in various groups, each group consisting say of five master or lead cards having punched therein, respectively, the name, street, town, state and country of an account along with five detail or trailer cards on each of which the items punched in all of the master cards can be printed.

By means of control punching, sensing will be suppressed from all cards except the card selected for sensing. Once a set-up has been made, it will be retained for printing on all following cards until cleared by control punching. The card selected for sensing and the line on which printing is to occur are conditioned by the manual setting of control means conveniently located on the front of the machine and identified as Sensing Control and Print Line Selector Control.

The card used, for example, is the Remington Rand type of card having ninety columns of index positions divided into upper and lower zones of forty-five columns per zone with each column presenting six data designation positions identified as 0, 1, 3, 5, 7 and 9 for the punching of data in a combination six position code.

The sensing control is in the card or cards from which sensing is to be obtained. This control can be manually set to one of six positions indicated as 0, 1, 3, 5, 7 and Inoperative. Each numbered position of the dial indicates that sensing can be obtained from only those cards containing a control punching in that position. The inoperative position indicates that sensing can be obtained from all cards regardless of control punching. The manual setting of the print line selector control shows that printing will occur on the horizontal line indicated, regardless of whether the upper or lower fields of the cards are being sensed. This control can be set to cause printing in any one of the unpunched positions of the card. The number one printing line is immediately above the punched zeros of the upper field. The thirteenth printing line is immediately below the punched nine of the lower field area. A separate Printing Suppression Control, with an operative and inoperative position, is also provided to eliminate unwanted printing on individual cards by means of control punching. When this control is set to the oeprative position all cards containing a print suppression control punching will not be printed. When this control is set to the inoperative position, print suppression control punching will have no effect and all cards will be printed.

The card or cards selected for sensing by the manual setting of the sensing control, are selected from a pattern of holes punched into these cards as above noted and from which information may be sensed. These cards will be designated as master card groups. Depending on the application, each group of master cards should contain an identical number of cards. The order of master cards within each group need not be maintained. Each master card can contain up to five individual cards. By utilizing both upper and lower field punching ten complete lines of printing can be obtained from five master cards. Every master card within each group must contain one posting control hole and one printing suppression control hole. The posting control hole can be specified for any column position except column 90, preferably columns 46 through 89. In addition to the posting and print control punchings, each card in every master card group must contain its individual identifying sensing control hole. These sensing and print control punchings are restricted to any of the 0, 1, 3, 5, 7 and 9 positions of any end of the card and are directly related to the 0, 1, 3, 5 and 7 positions of the sensing selection control means. There is no limit to the number of detail cards which can be printed from each master card group. They can be either punched or not punched in the card columns previously set up by their related master cards without effecting the end results. The presence of any control punching other than print suppression will provide for the printing of any added matter sensed in a detail card.

In the mechanical pin sensing of the card, as carried out in the Remington-Rand Card Interpreter, the pins that find holes in the card are latched up by latching slides so that the rising movement of the pin box will lift the sensing pins by force to raise the upper or data retaining pins and an important feature of my invention is the provision of means for suppressing the sensing of the data in a card by using a hole in the same card for controlling the operation of the latching slides so that the sensing action with respect to that card is nullified.

Figure 7:
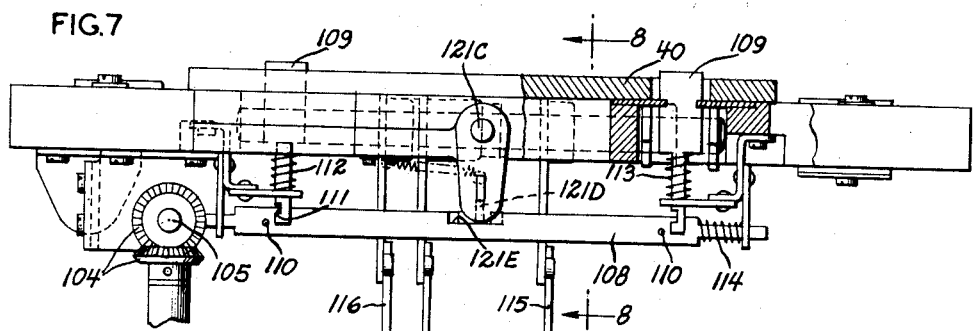

Other objects and structural details of the invention will be apparent from the following description when read in connection with the accompanying drawings, wherein Figs. 1 and 2, when combined, form a view in sectional elevation, looking at the right hand side of the interpreter, showing the sensing and printing mechanism, Fig. 3 is a sectional view similar to Fig. 2 showing further details of the sensing and printing mechanisms, Fig. 4 is an enlarged section on the line 4—4 of Fig. 3 showing a sensing control pin and break switch combination, Fig. 5 is a view similar to Fig. 4, showing a print suppression control pin and make switch combination, Fig. 6 is a plan view of the card table showing the arrangement of the card stops therein, Fig. 7 is a view in elevation of the card table shown in Fig. 6, a part being shown in section to illustrate the mounting of a stop.

Figure 8:
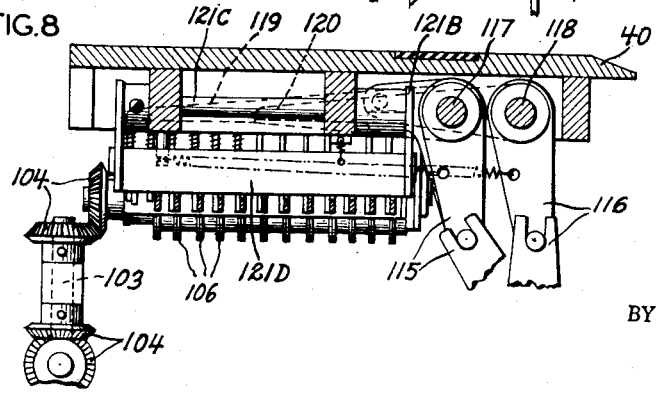
Figure 9:
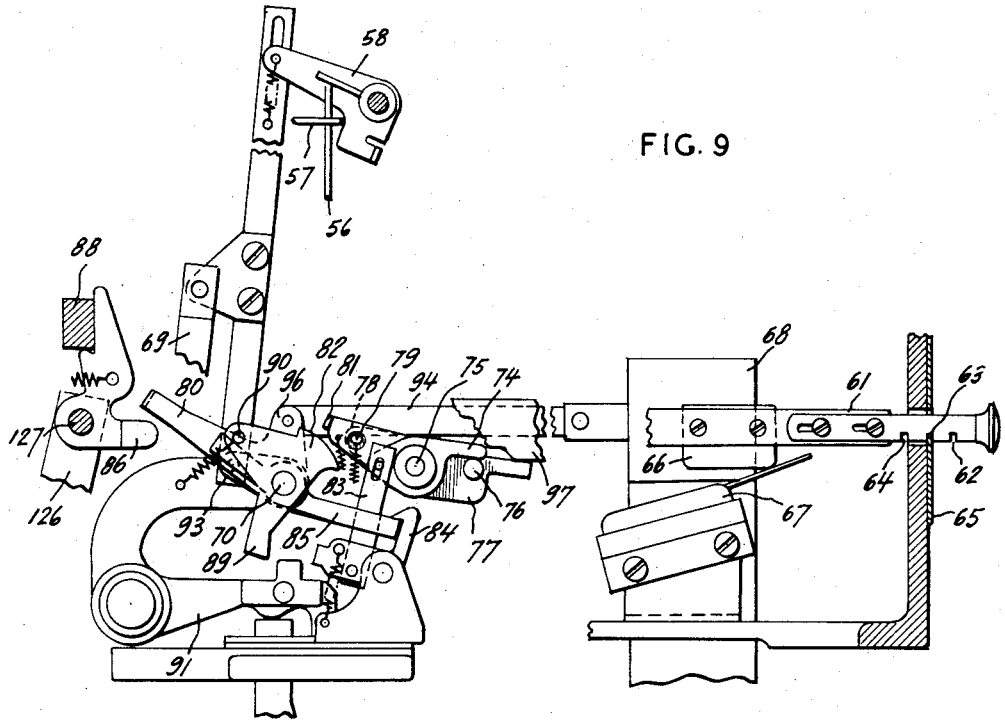
Figure 10:
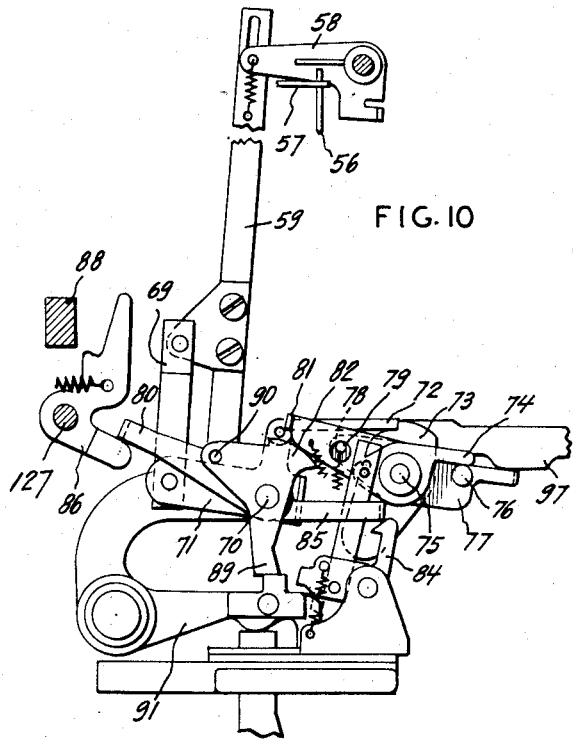
Figure 11:
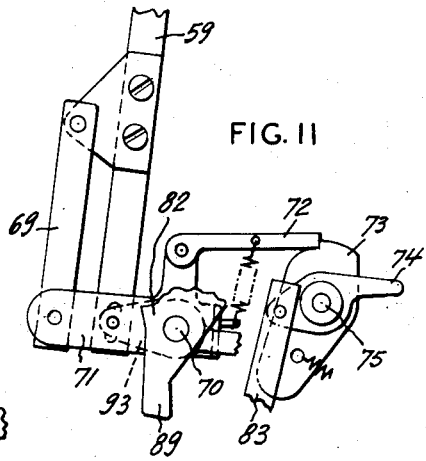

Fig. 8 is a section on the line 8—8 of Fig. 7 showing the card stop and retract means therefor, Fig. 9 is a view in side elevation of the print suppression control mechanism set in the "First Card Posting" adjusted position for non-printing, Fig. 10 is a view of part of the mechanism of Fig. 9 showing the same adjusted for printing, Fig. 11 is a detail view of part of the mechanism of Fig. 9, Figs. 12 and 13 are views similar to Figs. 9 and 10 showing the control mechanism adjusted for "All Card Posting,"

Figure 16:
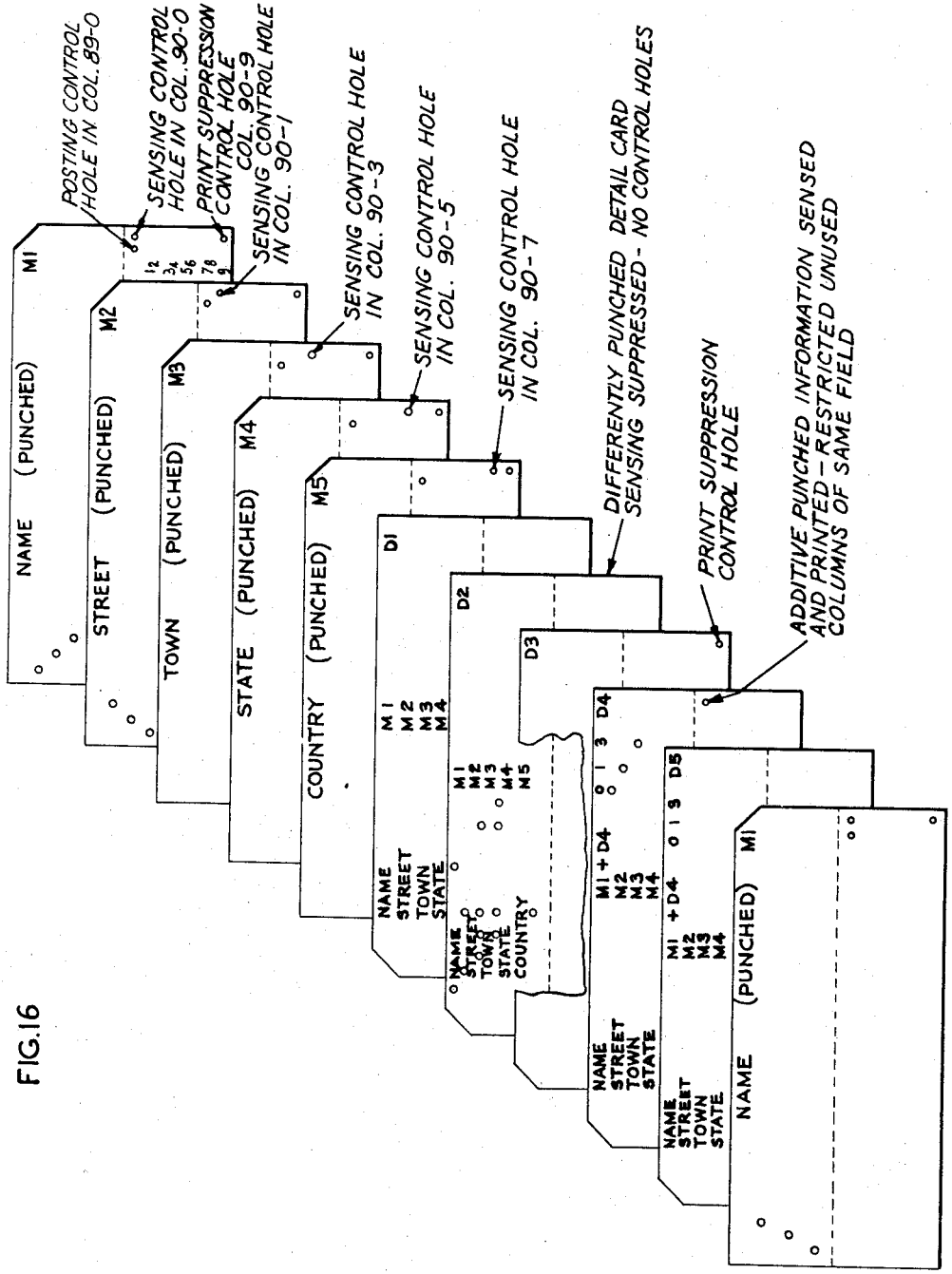

Fig. 14 is a sectional view of the card print table showing the means for selectively setting the card stops from the front of the machine, Fig. 15 is a detail view of the card stop controlling cam mounting, Fig. 16 is a diagrammatic representation of part of one deck of cards illustrating the arrangement of holes in the various cards to control the action of the machine, Fig. 17 is a face view of a control plate mounted on the front of the machine, Fig. 18 is a circuit illustrating the arrangement of controls used with the deck of cards shown in Fig. 16, and Fig. 19 is a circuit somewhat similar to that shown in Fig. 18 but showing a segregating feature used in the machine.

The mechanism of the printing machine illustrated in Figs. 1 and 2 is, in its general organization, shown and described in the patents to R. W. Ritzert No. 2,311,471 of February 16, 1943; J. Mueller No. 2,550,370 of April 24, 1951; O. E. Kase No. 2,817,292 of December 24, 1957; and O. E. Kase, 2,764,410 of September 25, 1956. Preforated cards are fed, one at a time, from a supply magazine 10 by a picker 11 and feed rolls 12 to an analyzing or sensing unit consisting of a lower sensing pin box 13 carrying sensing pins 14 and pin locking slides 15. The pin box is vertically reciprocated from a main shaft 16 so that the sensing pins 14 pass through the data index perforations of a card held in the card chamber 17 by a card stop 18 and cause the sensed data to be "set up" in an upper stationary pin box 19 provided with set pins 20, retract latch plates 21 and cam plates 22. The operations of the various parts are coordinated by suitable cams and fully described in the patents herein referred to.

As the data is "set up" in the upper pin box, the movements of the pins of the latter are transferred, through a removable connection box 23, to a decoding unit 24, whose stop bars 25 project to limit the upward travel of the printing wheel racks 26 that position the printing wheels 27 for printing impression on a card arrested thereneath by an adjustable stop mechanism 28 and held by a clamp or pressure pad 29. The racks are released for rising movement under the influence of their springs 33, and restored by a vertically reciprocated rack bail 30. After printing, the cards are passed by rolls 31 from printing platen 40 to an eject pocket 32. The present invention contemplates mechanism that may be selectively adjusted to carry out the functions of the machine covered by said patents and in addition makes it possible to carry out the objects of the invention as above set forth.

The card sensing mechanism contains in the lower pin box 13 a pin for each of the data index positions of a card and a locking slide 15 for each column of pins 14. When the pin box rises in each sensing cycle of machine operation, the pins that find holes in the cards will continue their upward travel under pressure of their individual springs. The pins that find no holes in a card will be held down and only those pins that do find holes in the card will be held up by their springs. The stud on each pin that finds a hole in a card will remain above a latch tooth on a latch side 15, at which time the slide 15 will be moved leftwardly (Fig. 2) to lock up the sensing pins 14. These are no locking studs on the control pins except on the pin for the posting control hole. This locking or latching movement of the slides is accomplished by the swinging movement of latch levers 34 pivoted to the pin box for movement therewith so that a roller 36 on the lower end of a lever 34 rides up and down the edges of a plate cam combination 37 to rock the shaft 38 on which the latch levers 34 are secured and support a slide operating bail rod 35 to which each slide is attached.

The cam combination consists of one fixed cam 39 of bracket form mounted on the base plate and having pivoted thereto as at 41 a companion cam 42 which will be referred to as the sensing control cam and which extends above the regular fixed sensing cam 39. The lower end of the cam 42 is spring biased so that the upper end will yield and swing in clockwise direction as the roller 36 rides up the edge thereof and beyond the top edge of cam 39 to cause the latch slides 15 to move leftward and lock up the pins that have found holes in the card. When it is desired to sense a card, a control hole pin 14, Figs. 2 and 4, in the 0, 1, 3, 5 and 7 positions of column ninety, which are the selected locations for sensing control in this device, will cause a pin 47 in the upper pin box to rise and, through a switch 43, deenergize a sensing suppression actuator magnet 44 to cause a detent 46 to be moved by its spring into non-blocking position with respect to the lower end of cam 42. As the roller 36 rides up the edge of the cam 42, beyond 39, the cam 42 will yield and swing clockwise with the result that the latch levers 34 will move the locking slides into pin latching position.

It is to be noted that, when the sensing control dial means 55, Fig. 17 is set at zero, a circuit is completed through the self closing switch 43 corresponding to the 0 position pin with the result that the sensing suppression actuator magnet 44 is held energized and holds the detent 46 in position to prevent yield of the cam 42 and pin lock-up action of the lever 34, so that no sensing action of the pins 14 can be transferred to the set pins 20 in the upper pin box 19. Because the springs of pins 14 are weaker than the springs of pins 20 the latter will not be raised unless the pins 14 are locked by the slides 15. The area of the card in which data information is punched is referred to as the data hole field and the area in which the control holes are punched is referred to as the control hole field.

In Fig. 4 there is shown in detail one of the features of the invention which is the use of a special set of control pins 47 in the nineteith column or control hole field of a card for control of sensing. These pins 47 having no extrusion are not adapted to be locked up, and all but the ones in column ninety rest, at their lower ends, on top of the relatively thick upper plate 48 of the card chamber which consists of said upper plate 48 and a lower thin plate 49, both being perforated to match the data index positions of a card to be sensed. The pins 47 are longer than the other pins 20 that sense data in the regular data fields of the cards, and extend to a point just short of the bottom surface of the upper plate 48 and it is evident that they will be engaged, in sensing action, by the sensing pins 14 earlier, and be moved upward sooner, than will the rest of the pins 20. Being in the nineteith column they are at one end of the sensing chamber and are each provided with a tongue 51 extending through the end wall of the card chamber to underlie and contact the upper fingers 52 of the particular strip switch 43 which is in circuit with the sensing suppression actuator magnet 44 above referred to. It will be evident that a control hole in any sensing control position 0, 1, 3, 5 and 7 of column ninety or the control hole field will break the circuit through a corresponding switch included in a bank of switches 50 and deenergize the magnet 44 with the result that, as sensing of the card takes place, the data sensed will be retained in the upper pin box and, unless released by a new sensing action, will set the print wheels in each cycle of machine operation. The pins 20 are referred to as "set" pins or "recording" pins because they may be locked up to retain the data sensed.

In accordance with the example disclosed in Fig. 16 there are shown five master or lead cards designated as M1, M2, M3, M4, and M5, each of which has punched in the upper zone or data field thereof data to be printed on one or more detail or trailer cards designated as D1, D2, D3, D4 and D5. In this arrangement we wish to keep these cards together in one deck and to run the deck through the machine to print each item punched in each master or lead card on one or more detail or trailer cards. The machine used for doing interpreting and printing is basically the one disclosed in Patent 2,311,471 and is provided with control means to adapt it to the present purpose without detracting from its original purpose which was the straight interpretation of punched cards and the printing thereof with the data punched therein. Each of the lead cards, as above noted, has a sensing control hole in one of the 0, 1, 3, 5 or 7 positions of column ninety, or the control hole field which also includes the column 89, and the machine is provided with the circuit maintaining dial type sensing control switch 55, Fig. 17, as well as a set link 61, Fig. 9, which is notched as at 62, 63 and 64 to provide three selective settings designated respectively as "Straight," "First Posting" and "All Card Posting." The set bar, if set in the "Straight" or 62 notch position will condition the machine for its regular interpreting function, but if set at position 64 the machine will operate in accordance with the example defined by the card illustration of Fig. 16 which is "All Card Posting." If the bar is set in position 63 the machine will operate for "First Card Posting."

When the card deck above referred to, is to be passed through the machine, the control 55 is set to correspond to the punching of the first master or lead card for the first run which is "0." The card M1 has a perforation in column 90 at zero position, designated as a sensing control hole; a hole at the 9 position of column 90, which is designated as a print suppression hole, and a hole in column 89 at the zero position designated as a posting control hole. The control hole positions may be referred to as the control hole field. The operation of sensing as controlled by the zero perforation in column 90 has been explained. The posting control hole controls several functions and when sensed; causes retraction of a previous setup of the data pins 20 and lock-up of the new data set-up, by transmitting the movement of the sensing pin 14 in the zero position of column 89 to the retract slide 21, which new data set-up is retained until a card with a posting control hole is sensed; operates the non-print mechanism for one machine cycle and through the mechanism of Figs. 9–13 prevents printing. The posting control may be any place in the card and when sensed, a wire 56 (Figs. 1 and 9) moves up to operate a flap 57 to rock an arm 58 which lifts a link 59 which corresponds to the link 57 in Fig. 5 of Patent 2,550,370 above referred to. The mechanism of Figs. 9–13 will be referred to as the printing and retract control cycling means. In Figs. 9 and 11 in this application a setting link 61 is mounted for endwise adjustment to any of three positions determined by the notches 62, 63 and 64 in the underside of the link for engagement with a holding plate 65, the notches corresponding to settings of the machine for different operations as above noted.

When the notch 62 is engaged by the plate the machine is conditioned for regular or "Straight Interpretation" of the card sensed and the printing thereon of the data so sensed, which condition is exemplified in Patent 2,311,471. When the notch 63 is engaging the plate 65 the machine is conditioned for "First Card Posting" or sensing of a lead card and printing the sensed data on a first trailer card which is the setting shown in Figs. 9 and 10. When the notch 64 is engaging the plate 65, Figs. 12 and 13 the machine is conditioned for operation in accordance with one phase of the present invention, that is the sensing of the lead card can be printed on all following trailer cards even though there are other lead cards between the one sensed and the first trailer card. This position of control is identified as "All Card Posting."

The underside of the link 61 carries a cam 66 for operation of a two position print control switch 67 effective in one position for "Straight Interpreting" and effective in the other position for both "First Card Posting" and "All Card Posting." The switch 67, when the link 61 is engaged in either of the notches 63 or 64, energizes the print control solenoid 68, Fig. 9, whose operation depends upon the sensing of a Print Suppression Control Hole, in any card whether the card is sensed or not, in column 90, position 9.

As shown in Fig. 12, when the control mechanism is set for "All Card Posting" with the setting link 61 pulled out for engagement of notch 64 with plate 65, and with a previous setup in the machine which has to be retracted, and the print suppression and posting control holes sensed, the latter will cause the posting control wire 56 to lift the link 59 to rock a yoke 71, Fig. 11, clockwise through link 69 so that a finger pawl 72 pushes a snap cam 73 to rock a shaft 75 clockwise to operate a print latch arm 74 which strikes pin 76 to rotate member 77 clockwise and lift a link 83 to release a retract control latch hook 84 from a retract lever latch 85 to rock a stud 70 so that an extension arm 80 thereon will swing away from the print lock-out pawl 86 so that the spring 87 of the latter will pull it beneath the fixed cross bar 88.

At the same time the shaft 75 rocks an arm 78 to cause a pin 79 therein to disengage a detent 81 from holding association with a retract interposing pawl 82 which then swings counterclockwise under spring urging to position a foot end 89 thereof over a cyclically lifted retract float arm 91 whose extension bail 92, Fig. 9, moves the retract latch plates 21 to release the pins that were set up in the upper pin box in the previous cycle. During sensing the retract operation occurs earlier than subsequent lock-up of the new data pins and the continued upward movement of link 59 will swing an arm 93 to rock stud 70 clockwise and rock latch 85 so that an extended spade end 85A thereof will engage a pin 90 on the rear face of the retract pawl 82 to move it clockwise to latch the pawl 82 by detent 81, in non-retract position.

When the first trailer card, which has no print suppression control punching, comes into the sensing mechanism and the print control switch 95 is open, the print control solenoid 68 will not be energized and the lock-out pawl 86 will not be held beneath the bar 88 and printing will occur. If the trailer had a hole in the print suppression position (col. 90–9) the solenoid 68, Fig. 9, would be energized to pull on its rod 94 and through arm 96 would rock stud 70 and cause the extension 80 to release the print lock-out pawl so that its spring 87 would pull it beneath the bar 88. Since printing takes place about one cycle later, the latch 84 operates as above described to hold extension arm 80 away from the lock-out pawl 86 to prevent printing. When the next lead card comes into the sensing chamber its sensing control hole in the "1" position has no effect because the machine has been set, in the first run, with the dial 55 on the "0" position. Since there is no circuit established through the "1" switch of the switch bank 50, by the sensing control dial switch 55, the magnet 44 of the sensing suppression control will remain energized and hold the detent 46 in engagement with cam 42 to prevent lock-up of the sensing pins in the lower pin box 13.

The action of the print and retract control mechanism described is modified by the 62 and 63 notch positions of the setting link 61 whose cam 97, on the under edge thereof, Figs. 9 and 10 prevents the detent 81 from being effective to hold the retract pawl 82 out of retract operating position through operation of member 77. This condition of the mechanism is necessary in straight interpretation and in the first card posting operations indicated by said notches 62 and 63 respectively. In straight interpretation, printing is suppressed by the suppression of sensing because link 61, set in the 62 position, causes the cam 66 to release 67 and complete circuit lines 4, 3 (Fig. 18) to energize the sensing suppression actuator 44. The latch mechanism 84, as previously described, is ineffective because cam 97 holds 77 inoperative. Also, because no printing wheel racks 26 will rise, non-print pawls 26A will be effective to block printing.

The set-up of the data sensed in the first lead card M1, is carried in the upper pin box while the rest of the lead cards M2, M3, M4 and M5 pass through the sensing mechanism, and as each of these four cards do not have a control hole in the "0" position, no data therein can be sensed and no printing on these cards takes place as they pass through the printing mechanism because of the presence of the print suppression control holes in the cards. As soon, however, as the first trailer card D1 comes into the sensing chamber, and as the card does not have a print suppression hole in col. 90 position 9 the mechanism is conditioned to automatically print the data of the first lead card M1 on the first trailer D1.

The printing of the trailer cards can be done on any selected line and for this purpose means are provided for positioning the trailer cards on the print platen 40 by the operation of a "Print Line Selector" 98 whose control dial on the front of the machine, adjacent the sensing control 55, makes the setting of the stops very convenient. The control includes a dial knob 99, Figs. 1 and 14, for operating a combination of shafts 100, 101, 102 and 103 interconnected by miter gears 104 to a splined cam shaft 105 on which are mounted a series or bank of twelve cams 106, Fig. 15, having, when in place on the shaft 105, progressively arranged peripheral cam depressions 107. Any one of thirteen stops 109 can be selectively set in accordance with the Print Line Selector numerals 1 to 13 which represent the number of lines on the card upon which printing may take place, and the location of a card in the print chamber, in accordance therewith. The thirteenth stop is not cam controlled and rises in every cycle.

When the deck of cards is to be run through the machine for printing on the first line, the Printing Selector will be set at "1" and this will rotate the bank of cams to set the first cam so that its depression will be aligned with one end of a stop latch bar 108, of which there is one for each set of thirteen stops 109, Figs. 6, 7 and 8, the bars 108 having detent pins 110 for engagement in the notches 111 of the lower shank ends 112 of each stop blade disposed at opposite sides of the platen 40. The latter is slotted to receive the stops 109 which are under a lifting pressure of their springs 113. The stop latch bars 108 are urged leftwardly (Fig. 7) by their springs 114.

The shaft 123 carries suitable cams for timing the operation of levers 115 and 116 for rocking the shafts 117 and 118 respectively, once in every machine cycle to raise stop depressors 119 and 120 secured respectively to the shafts 117 and 118. The shaft 117 also carries a bell crank arm 121 whose pin 121A, through an arm 121B, rocks a bail shaft 121C to swing a bail blade 121D, in engagement with a notch 121E in the upper edge of each stop latch bar 108, in synchronism with the stop release or depressor arms 119 and 120, to let the pins or studs 110 out of the notches 111 of the shank ends 112 of the stops 109 as seen in Fig. 7.

At the proper time in the cycle of operation, as determined by the cams, the stop arms 119 and 120 will rise and release the stops 109 corresponding to the selected line of the card, on which printing is to occur, after said stops have been released by the movement of the corresponding stop latch bar 108 as permitted by the depression 107 of the cam positioned by the adjustment afforded by the print line selector 98. Because of the proximity of the first sets of stops to the print wheels, card stops 1 to 7 are depressed before firing of the print wheels while the card is being held by the pad 29. The card stops 8 to 13 are depressed after firing. In the second run of the cards through the machine, the selector will be set at "2" and printing will occur on the line of the card so designated. Through operation of the stop retract arms 119 and 120 each of which control respectively the first seven and the next six lines of printing on the card, the data can be printed in different runs of the cards in the upper and lower zones of the detail cards as is desirable. The bail blade 121D, Fig. 7, swings clockwise to let the springs 114 of the stop latch bars 108 move the studs 110 out of the corresponding shanks and swings counterclockwise to put the studs back into the notches 111 of the stops after the latter are depressed by the stop depressors.

The printing mechanism of the foregoing patents is employed herein and varies in such details as are necessary to adapt the present invention thereto. A cam shaft 123 carrying a number of control cams including a printing wheel firing cam 124, a printing wheel restoring cam 125, and a pressure pad cam 122, is driven in synchronism with the main shaft 16 through the worm gear and wheel combination shown in Fig. 13 of the Ritzert patent referred to and wherein the shafts 121 and 172 have their counterparts in the present shafts 16 and 123, respectively.

Through suitable pitmans operated from the shaft 16 to raise and lower rack bail 30 (Fig. 1), the racks 26 are permitted to rise under influence of their springs 33 to position the printing wheels 27 for printing, said racks being restored by downward movement of the bail. The racks straddle a fixed cross bar 88, beneath an end of which is disposed a print lock-out pawl 86 pivoted at the upper end of a connecting rod 126, as at 127, and to one arm of a bell crank 128. The other arm of bell crank 128 is connected by a restoring link 129 with a bail rocker 130, the restoring bail rod 131 of which moves out of the path of the firing fingers 135 operated by spring actuated plunger pins 135A which force the print wheels 27, with their support arms 132, down to effect printing action when said fingers are released by a firing bail 133.

The firing bail is actuated through a release arm 134, bell crank 136, draw link 137, cam arm 138 and cam 124 while the restoring bail rod 131 which restores the printing wheels to fully retracted position after printing occurs, is operated by a cam lever 140 connected to rod 126 and actuated by cam 125. The bell crank 128 and print lock-out pawl 86 are connected by a spring 87 which tends to keep the upper end of the pawl 86 beneath the bar 88 and, as rod 126 is permitted to rise by the low part of its controlling cam 125, it is prevented from having such full rising movement as would withdraw the bail 131 completely out of the path of the firing fingers 135. Hence, when the upper end of the print lock-out pawl 86 is in position to engage the underside of bar 88, printing cannot occur.

In the wiring diagrams, Fig. 18 illustrates the wiring for the machine when wired to selectively sense groups of lead cards which maintain up to five cards in a group. An alternating current supply is plugged to the receptacle 201 and is carried by leads 202, 203, each containing fuses of suitable capacity, to an outlet receptacle 204 which is ordinarily provided in machines of this type for plugging in accessory equipment. Connected to the lead 202 is a machine on-off-switch 205 which in the "on" position connects lead 202 to lead 206 running to the driving motor 207 of the machine. A lead 208 connects the other side of the motor to lead 203 to thereby complete the motor circuit. The switch 205, in the "on" position, also connects lead 202 with a lead 209 running to a cutoff switch 210 under control of the machine clutch, the circuit continuing over lead 211 to the primary winding of a transformer 212, the transformer primary circuit being completed by a lead 213 wherein it is connected at plug receptacle 204 to the alternating supply lead 203. The primary winding of the transformer is connected by leads 214, 216 to a full wave rectifier 215 for supplying direct current to the controlling circuits hereinafter described. The switch 210 is provided so as to interrupt or cut off the direct current supply for the controlling circuits when the clutch is disengaged as a safety precaution, permitting or supplying direct current only when the clutch is in engagement.

The rectifier is connected by leads 217, 218 to terminals of a terminal board 220, indicated by the dotted line enclosure, the particular terminals of the board being numbered to facilitate tracing of the circuits, the terminals of the diagram being hereinafter designated by the prefix T. The lead 217 connects the positive side of rectifier with the positive terminal T20 of the terminal board and lead 218 connects the negative side of the rectifier with the negative terminal T16 of the terminal board. The terminal board 220 includes a network of resistors 221 and condensers 222 connected in the usual manner for voltage limiting and arc suppression purposes and interposed in the circuit between the direct current supply terminals 16, 20 and the other terminals of the board which connect the direct current supply with the various controlling devices.

The positive direct current supply terminal T20 is connected by lead 223, including a resistor 221, with a terminal T6 which in turn is wired to the common supply contact 55a of the sensing selector switch 55. It will be noted that the contact 55a of the switch is slightly longer than the other contacts 55b of the switch so as to make contact with the conducting ring 55c in each switch position. The switch is shown in the inoperative position with the contact lug 55d formed on the contact ring 55c engaging the supply contact 55a. As the switch is rotated from one or the other positions the contact 55a will maintain contact with the ring while the lug 55b completes the circuit through the selected one of the contacts 55d.

In the event it were desired to sense only those lead cards having a control hole punching in the "0" control position, the switch would be rotated one switch position clockwise so as to complete a circuit to the switch contact 55b for T11, which circuit would then run to terminals T11 of the terminal board and then to terminal T11 of the sensing pin switch block 50. T11 connects with the sensing pin operated switch for the "0" control position, the other side of the switch being connected by a common lead to T12 of the sensing pin switch block from which the circuit runs to T12 of the terminal board and thence through a return lead 224 through one of the resistors 221 to T15 of the terminal board. From the terminal board the circuit runs to T15 of the sensing suppression actuator 44, the circuit from the sensing suppression actuator being completed from lead T16 of the actuator to T16 of the terminal board, which latter terminal is the negative terminal of the board, it being connected by lead 218 with a negative side of the rectifier as heretofore mentioned.

Accordingly, with the sensing selector switch 55 set to sense only cards having a control hole punched in the "0" position it will be seen that every card in the sensing chamber which does not have a control hole punched in the "0" position will permit this circuit to be made to the sensing suppression actuator 44 thereby effectively suppressing the sensing of said card. However, each card which does have a control hole punched in the "0" control hole position will, at the beginning of the sensing operation, open the switch in the switch block 50 associated with the "0" control position so as to interrupt the circuit through the sensing suppression actuator 44 thereby permitting the entire card to be sensed.

Accordingly, it will be seen that if the selector switch 55 should be set in any one or the other operative positions a related one of the sensing pin operated switches of the switch block 50 will be placed in the control circuit so that if a control hole is sensed in the selected control position the circuit through the sensing suppression actuator 44 will be broken to enable sensing of the entire card, whereas if no control hole is sensed in the selected control hole position a circuit will be completed through the sensing suppression actuator 44 to effectively cause the actuator to suppress sensing of the entire card. It will be seen that T10 of the selector switch connects with T10 of the sensing pin switch block 50 which is connected to the switch for the "1" control hole position of the card, likewise terminals T9, T8 and T7 are in the circuits for the switches associated with the "3," "5" and "7," respectively, control hole positions of the card. It will therefore be apparent that up to five lead cards may be included within a lead card group, and with each card punched with its separate identifying control hole position only the selected one of the lead cards will be sensed during a single run of a posting operation, the information sensed from the selected card being held and retained in the machine to be printed on the first following card which does not have a control hole punched in the "9" control position, otherwise known as the print suppression control hole position of the card.

The circuit for controlling the suppression of printing connects with the positive lead 223 at the resistor condenser network and runs through lead 225 to T1 of the terminal board 220. The circuit continues to T1 of a print suppression switch 95 which is provided to disable the print suppression control circuit for other types of runs of the cards wherein it may be desired to print on a card even though it contains a print suppression control hole. The circuit continues from T2 at the other side of the print suppression control switch running to T2 of the terminal board and thence to T2 of the sensing pin switch block 50 where it connects to the switch for the "9" control hole position which it will be noted is the only switch in the switch block of the "make" type. The circuit continues from T4 of the sensing pin switch block to T4 of the terminal board and thence to T4 of the posting control lever switch 67, heretofore mentioned, which is conditioned by the setting of the posting control link 61. In the two types of posting operations, i.e. first card posting or all card posting as determined by the setting of the posting control link 61, the switch contacts are in the position shown in Fig. 18. When the machine is set up for a straight interpreting operation with the posting control link set at its innermost position the switch contact is shifted to its other position.

In the position shown, the circuit is completed from T4 of the switch to T13 running thence to T13 of the print suppression solenoid 68, heretofore mentioned, running thence from T5 of the print suppression solenoid to T5 of the terminal board. The circuit is then completed from T5 of the terminal board to one of the resistors 221 to a connection with T16 of the terminal board which is the negative terminal, being connected, by lead 218 with the negative side of rectifier 215 as heretofore mentioned. Operation of the print suppression solenoid operates to prevent printing on the card which at the time the solenoid operates is in the sensing chamber. Accordingly, in each type of positing operation the detection of a print suppression control hole in a card will in each instance cause the print suppression solenoid 68 to operate thus preventing printing on that card.

Print suppression under control of the print suppression control hole may also be effective in the straight interpreting operations. However, in straight interpreting operation the non-print mechanism in the printing control device is not effective so that other means are provided for effecting the suppression of printing. In straight interpreting operations the posting control lever is set at its inner-most position whereby the associated switch 67 is released so as to make contact between the switch terminals T4 and T3. Thus when the sensing pin switch corresponding to the "9" position, i.e. print suppression control position, of the sensing pin switch block 50 is closed by the detection of a control hole in that position, the circuit will then extend from T3 of the posting control switch 67 to T3 of the terminal board. The circuit then runs through a resistor 221 of the terminal board to T15 of the terminal board and then to T15 of the sensing suppression actuator 44 returning from T16 of the sensing suppression actuator to T16 of the terminal board which, as aforementioned, is the negative terminal. Accordingly, in straight interpreting operations a card, containing a print suppression control hole will not be sensed, and since in this type of operation the lower sensing pins are not locked up there will be no set up in the locking pin box. Since means are provided in the machine, as described in the aforementioned Patent 2,550,370, for preventing any printing when there is no information setup in the locking pin box, printing on the card will thus be effectively suppressed.

In some machine installations it may never be required that posting operations involve selective sensing of more than four cards in a lead card group. Under such circumstances one of the control hole positions, i.e. preferably the "7" control hole position of column 90 of the card, can be utilized for a control function other than the selective sensing function one function of which may be controlled from this control position is a segregating or outfiling function, and a modified wiring diagram illustrating the use of this control position for segregating or outfiling purposes is illustrated in Fig. 19.

As seen in Fig. 19, the sensing pin switch block 50 is modified to the extent of providing a "make" switch for the "7" control hole position in the place of the "break" switch employed when this control hole position is used for sensing selection. In addition, the common return wire from the switch block 50 to T12 of the terminal board is connected to the switch at the "5" instead of the "7" control hole position thus providing not only the first four control hole positions of column 90 with a common return for completing the same circuits as previously described to sensing suppression actuator 44. As seen in Fig. 19, T6 of the terminal board which as previously described is connected through the resistor condenser network to the positive terminal T20 of the terminal board is also connected by a lead 226 with T6 of the switch block 50. This latter terminal is connected to the switch for the "7" control hole position which when closed by the sensing of the control position continues the circuit to T7 of the terminal board. From terminal board terminal T7 the circuit runs through an additional resistor to T4 of the terminal board and thence through a cam controlled timing switch 227 to T14 of an outfiler actuator 230. From T16 at the other side of outfiler actuator the circuit runs to an outfiler on-off switch 231 to T16 of the sensing suppression actuator 44 which is connected directly to the negative terminal T16 of the terminal board. The actuator 230 is not otherwise shown in the drawings since its location and operation is the same as that shown in the aforesaid Patent 2,764,410. Briefly stated, the actuator operates to setup by rotary camming device which is timed to operate a deflector mechanism in the card feed path at the proper moment of a card feeding cycle. In the present machine, the timing switch 227 operated by the timing cam 228 is provided to delay operation of the actuator 230 to allow for the slightly advanced timing involved in the novel means herein employed for sensing the control hole positions.

It will be noted that the outfiler control function may be employed in combination with the sensing selection control function and the print suppression control function. Any card containing a control hole in the "7" control position, i.e. outfiler control position, will, when the outfiler control switch 231 is in the on position, cause the card to be outfiled or segregated. This function will occur regardless whether or not the same card has control holes for sensing selection and/or print suppression. It will also be noted that the outfiler control may also be advantageously employed for outfiling a selected one or more of a group of trailer cards. The outfiler control means just described is effective in both posting and straight interpreting operations and represents outfiling control means in addition to the outfiling control, described in the aforesaid Patent 2,764,410, which results from sensing of a posting control hole in a lead card.

It is evident therefor, that, by use of the control mechanism disclosed herein, and as controlled by the sensing suppression applied in the same cycle that a card is sensed to prevent sensing of that card, in combination with the controls brought into action by the posting control holes and the print suppression control holes in a card, that a very flexible control is provided, in a printing interpreter, which adapts it for many uses of a customer whose requirements would have otherwise made necessary the purchase of additional machines to carry out the operations possible with the present invention, as applied to a standard interpreting machine.

As an example the machine can, through its controls as disclosed herein, handle the example above disclosed by using; a constant number of lead cards arranged in progressive order for printing any number of trailer cards; a constant number of lead cards not arranged in progressive order; a variable number of lead cards not arranged in progressive order; straight interpretation of lead or master cards only in the beginning of a deck, after a normalizing machine cycle with a variable number of leader cards not arranged in progressive order; or a constant number of lead cards arranged in reverse order and the sensing and printing of added information and differently punched data in unused columns of the same field in a trailer card. It is further evident that the master or lead cards need not be maintained in any particular order as long as they are correctly punched with their respective sensing holes. The use of a segregating signal hole, which may be used in col. 90 position 7 is contemplated and as set forth in the description of the circuit of Fig. 19.

My invention is not to be restricted to the precise details of construction shown since various changes and modifications therein may be made without departing from the scope of the invention or sacrificing the advantages desired from its use.

What I claim is:

1. In a machine controlled by punched cards, sensing means including upper and lower pin boxes, pins in the lower box for sensing perforations in said cards, pins in the upper box simultaneously movable by the pins in the lower box that have sensed perforations in said cards, means for locking up the pins in the lower box that have sensed openings in the cards, selected pins in the upper box being arranged for engagement by the lower box pins earlier than other of said pins in the upper box and means controlled by said selected pins for rendering said pin lock-up means effective.

2. In a machine controlled by a punched record, sensing means including a movable set of first pins and a fixed set of second pins, the pins of the first set being adapted to sense perforations in said record, means for latching up the pins of the first set that have sensed openings in the record, the pins of the second set being simultaneously movable by the latched-up pins of the first set that have sensed perforations in said record, selected pins in the second set being arranged for engagement by certain pins of the first set earlier than the other pins in said second set, and means controlled by said selected pins for rendering said latch-up means effective.

3. In a machine controlled by a punched record, sensing means including a movable set of first pins and a fixed set of second pins, means for moving the pins of the first set to sense perforations in said record, means controlled by said moving means for latching up the pins of the first set that sense openings in the record, the pins of the second set being movable by the latched-up pins of the first set that have sensed openings in the record, selected pins in said second set being extended for initial movement by certain pins of the first set earlier than the other pins in said second set, and means controlled by said selected pins for rendering said latch-up means effective.

4. In a card interpreting and printing machine, means for feeding cards alternately arranged in groups identified as lead and trailer cards, means for sensing perforations in all of the cards, including sensing pins, means for latching up the pins that sense holes in the cards and means for normally holding said latching means disabled, means for controlling the sensing of the data in a selected lead card of the group including control pin means influenced by a perforation in said lead card for enabling said latching means, and means for printing on the trailer cards the data sensed in said selected lead card.

5. In a card interpreting and printing machine, means for feeding cards alternately arranged in different groups, means for sensing perforations in all of the cards, means for rendering said sensing means normally ineffective, means for controlling the sensing of the data in the cards of a first group including control pin means influenced by a perforation at a preselected position in each of the cards of said first group for rendering said sensing means effective, and means for printing on the cards of a second group the data sensed in the cards of said first group.

6. A card interpreting and printing machine as set forth in claim 5, in which said control pin means comprises a circuit including means normally energized for suppressing sensing, a plurality of break switches for maintaining said circuit, and a pin for actuating one of said switches to break said circuit and de-energize said sensing suppression means.

7. In a card interpreting and printing machine, means for feeding cards arranged in alternate groups of lead and trailer cards, means for sensing perforations in all of the cards, means for rendering said sensing means normally ineffective, means for controlling the sensing of the data in the lead cards comprising a circuit including said rendering means, switch means corresponding to control hole positions in the lead cards for maintaining said circuit, control pin means influenced by a perforation in a predetermined position of the card for actuating the corresponding switch to alter the circuit and render said sensing means effective, and means for printing on a trailer card the data in a lead card.

8. In a card interpreting and printing machine, means for feeding cards arranged in alternate groups of lead and trailer cards, means for sensing perforations in all of said cards, means for printing on all of said cards, means for rendering said sensing means normally ineffective, means for rendering said printing means normally effective, control pin means influenced by a perforation in said cards for rendering said sensing means effective and control pin means influenced by another perforation in said cards for rendering said printing means ineffective.

9. A card interpreting and printing machine as set forth in claim 8, in which said control pin means for rendering the sensing means effective comprises a circuit including a switch corresponding to each of several data designation positions in a card sensed to operate said control pin and a sensing control switch in the circuit having positions of adjustment corresponding to said switches and to said data designation positions of the card for rendering the sensing means effective for sensing a card having a perforation only in a position indicated by said sensing control switch.

10. A card interpreting and printing machine as set forth in claim 7 including a printing platen, stops for arresting a card on the printing platen in selected line position, printline selector means including a cam for each line position and conveniently accessible means for setting said cams, stop releasing means controlled by said cams, and means for cyclically retracting said set stops for discharge of a card from the printing platen.

11. In a selective posting interpreting and printing machine, means for feeding alternately arranged groups of perforated lead and trailer cards, means for sensing data perforated in the cards of the lead group, control pin means influenced by a perforation in a predetermined location in the cards of the lead group for controlling the operation of said sensing means, means for printing sensed data on the cards of the trailer group, including a print chamber having card stops corresponding to printing line locations on said trailer cards and manually settable means for adjusting said stops in accordance with the printing line location desired.

12. In a selective posting interpreter and printing machine, means for feeding alternately arranged groups of lead and trailer cards, means for sensing data perforated in the cards of the lead group, including circuit means corresponding to different control hole locations in the card to be sensed, manually settable means for altering said circuit means corresponding to a selected control hole location, and said sensing means being adapted to further alter said circuit means in different conditions of alteration afforded by said manually settable means.

13. Card sensing means comprising pins for sensing holes in a data field and in a control hole field of a card, means for moving all of said pins in unison, means for locking-up the pins sensing holes in the data field and means controlled by pins sensing holes in the control hole field for altering the operation of said pin locking-up means.

14. A card sensing means as set forth in claim 13 in which said pin locking means includes circuit means for holding said pin locking-up means in one condition and said control hole pins being movable earlier than said data hole pins to affect said circuit and change the condition of said pin lock-up means.

15. In a machine controlled by data cards punched to provide data hole fields and control hole fields, card sensing means including pins for sensing holes in both fields and means for locking up the pins sensing holes in the data fields, means controlled by the pins sensing holes in the control field for enabling said pin lock-up means to lock up the pins sensing holes in the data field, printing control and sensing retract control cycling mechanism, means for manually adjusting the mechanism for a selected type of machine operation, and a control pin influenced by a control hole in said data hole field for altering operation of said mechanism for control of printing and retract of said pin lock-up means, and auxiliary circuit means operated by said manual adjusting means for further control of printing operation during said different selected types of machine operation.

16. A machine as set forth in claim 15 in which said card sensing means includes data hole sensing and recording pins and control hole sensing and recording pins, means for moving all of the sensing pins simultaneously and all of the control hole recording pins earlier than the data hole recording pins, and means for locking up all of the pins that have sensed holes in the card and means controlled by said control hole sensing pins for altering the operation of said pin locking means during operation of said pin moving means.

17. In a selective posting interpreter, card sensing pin means, card recording pin means, means for moving said sensing pin means, card printing means, means for feeding cards successively through said sensing and printing means, said cards having data hole fields and control hole fields, pin lock-up means, control hole pins for sensing said control hole fields, means operated by said control hole pins for affecting the action of said pin lock-up means during the movement of said sensing pin means, a printing and sensing retract control mechanism, means for manually adjusting said latter mechanism to provide variable operation of said pin lock-up means and the printing means, and control pin means for further altering the action of said mechanism in different conditions of adjustment.

18. A selective posting interpreter of the character defined in claim 17 in which said printing and retract control mechanism includes a cyclically operated member for operating said pin lock-up means, and means controlled by said manual adjustment means for altering the operation of said retract control mechanism and the print control of said mechanism.

19. In a selective posting interpreter, means for sensing cards, means for printing on said cards, means for feeding the cards through said sensing and printing means, said cards being arranged in groups of lead and trailer cards and presenting data hole fields and control hole fields, a printing and sensing retract control means for conditioning said sensing means and said printing means for selective operation, manually adjustable means for setting said control means for different interpreting and printing operations, pins for sensing the control hole fields of lead cards, manually settable means coacting with the control hole field sensing pins for enabling the operation of the pins sensing data hole fields in different lead cards, a print chamber, card stops in said chamber, manually settable means for arresting trailer cards to be printed on with data sensed in corresponding lead cards, posting control means for altering the operation of said printing and sensing retract control means, a print suppression control pin circuit means for disabling said printing means, and means operated by said manually adjustable control setting means for conditioning said control pin circuit means for operation when a non-print control hole is sensed by a corresponding control pin.

References Cited in the file of this patent

UNITED STATES PATENTS

| | | |
|---|---|---|
| 1,785,999 | Bryce | Dec. 23, 1930 |
| 1,914,292 | Reynolds | June 13, 1933 |
| 2,493,858 | Carroll et al. | Jan. 10, 1950 |